(12) United States Patent
Cooch

(10) Patent No.: US 6,404,123 B1
(45) Date of Patent: Jun. 11, 2002

(54) CHANNELED GLASS ARTICLE FOR COMPACT FLUORESCENT LIGHTING

(75) Inventor: Stephen L. Cooch, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/327,888

(22) Filed: Jun. 8, 1999

Related U.S. Application Data
(60) Provisional application No. 60/097,394, filed on Aug. 21, 1998.

(51) Int. Cl.[7] .................................................. H01J 1/62
(52) U.S. Cl. ........................................ 313/493; 313/634
(58) Field of Search ................................. 313/493, 491, 313/634, 573, 576, 635, 17, 25, 26

(56) References Cited

U.S. PATENT DOCUMENTS

| | | | |
|---|---|---|---|
| 2,102,049 A | * 12/1937 | Warren ........................ 313/491 |
| 4,584,501 A | 4/1986 | Cocks et al. ................. 313/493 |
| 4,781,955 A | * 11/1988 | Noe ............................. 313/634 |
| 4,990,826 A | 2/1991 | Cocks et al. ................. 313/485 |
| 5,036,243 A | 7/1991 | Cocks et al. .................. 313/39 |
| 5,412,280 A | * 5/1995 | Scott et al. .................. 313/573 |
| 5,552,666 A | * 9/1996 | Shea et al. ................... 313/493 |
| 5,834,888 A | * 11/1998 | Allen et al. .................. 313/484 |
| 6,064,155 A | * 5/2000 | Maya et al. .................. 313/493 |

* cited by examiner

Primary Examiner—Vip Patel
Assistant Examiner—Joseph Williams
(74) Attorney, Agent, or Firm—Timothy M. Schaeberle; Anca C. Gheorghiu; Patrick P. Pacella

(57) ABSTRACT

A compact fluorescent lamp in the shape of a conventional light bulb. The exterior and interior surfaces of the lamp are formed by the front and back surfaces of an envelope which defines a cavity whose surface is coated with phosphor. There is a gas discharge channel having at least two electrodes, is located within the cavity for receiving a discharge or ionizable gas. A ballast housed in the cavity is electrically connected to the two electrodes, and when connected to a screw-base, the base is in electrical contact with the ballast.

11 Claims, 7 Drawing Sheets

CHANNELED GLASS ARTICLE FOR COMPACT FLUORESCENT LIGHTING

This application claims the benefit of U.S. Provisional Application, Ser. No. 60/097,394 filed Aug. 21, 1998 entitled Channeled Glass Article For Compact Fluorescent Lighting, by Stephen L. Cooch.

TECHNICAL FIELD

This invention relates to channeled glass articles such as neon or fluorescent lamps. More specifically, the glass articles are compact discharge lamps which can have the shape of conventional light bulbs.

BACKGROUND OF THE INVENTION

Neon lighting devices are disclosed in U.S. Pat. No. 4,584,501 (Cocks et al.), U.S. Pat. No. 4,990,826 (Cocks et al.) and U.S. Pat. No. 5,036,243 (Cocks et al.). Generally, these patents disclose multifaceted lighting devices comprising glass or other vitreous plates which are hermetically sealed together to form a device with internally enclosed channels. These channels are thereafter evacuated and back-filled with an inert gas such as neon and thereafter ionized through the provision of a series of electrodes.

Generally, the method for forming the glass component of these prior art neon lighting devices involves cutting channels in a bottom glass plate followed by hermetically sealing a glass top plate to this channeled glass bottom plate. Various methods are used to cut the channels into the bottom glass plate including grinding, etching and sandblasting through an adhesive rubberized mask exhibiting a pattern identical in shape to the desired channel pattern.

In the past, many attempts have been made to produce fluorescent light envelopes that look like conventional light bulbs rather than the commonly found fluorescent tubes. These attempts merely resulted in bent tubes inside spherical, bulbous translucent envelopes with conventional incandescent bulb base caps. The bent tube, screw-in replacements for standard incandescent lamps were not very efficient and did not lend themselves to high-speed mass production.

Other attempts at producing spherical-bulb fluorescent lamps tried to avoid sealing the channels. However, when the channels are not sealed, cross communication between adjacent discharge paths occurs leading to undesirable effects. Attempts to prevent the arc from taking shortcut paths have had little success. To avoid this problem, one suggested solution makes the gap between the glass halves of the channel very small to increase resistance along the secondary path. This forces the arc discharge to follow the main current path along the channel. Another solution fills the gap with glass fibers or glass wool. Still another solution attempts to prevent cross talk by designing the ratio of the short path length to the ordinary discharge path length within certain ranges. Yet another attempt forms an evacuable envelope including inner and outer glass members of tapered cylindrical shape in nested coaxial relationship.

SUMMARY OF INVENTION

Briefly, the invention relates to a compact fluorescent lamp whose exterior and interior surfaces are defined by the front and back surfaces respectively, of a transparent envelope. One key aspect of the inventive lamp is that envelope has the shape of a conventional light bulb. The interior surface of the lamp defines a cavity whose walls (the interior surface of the lamp), is coated with phosphor. The transparent envelope is preferably made from glass and transparent glass-ceramic materials.

In another aspect, the interior surface includes at least one gas discharge channel capable of receiving a discharge or an ionizable gas, and at least two electrodes in communication with the channel. Preferably, the electrodes are located at opposite ends of the gas discharge channel and serve to generate an arc discharge when activated. A ballast housed in the cavity is also in electrical contact with the electrodes. When completely assembled, the envelope is secured to a screw-in base which is in electrical contact with the ballast.

In one aspect, this invention provides curved surfaces with formed, imbedded channels to replace the bent tubing commonly found in existing fluorescent lamps. This is done by forming sheets of glass that can be vacuum formed and/or pressed into the curved surfaces with integral channels. The process allows significant design flexibility for the lamp makers, including complex variations in the shape of the curved surface; the channel width and depth; and the general design of the channel path. The curved surface can be smooth with channels on one side, or part of the channel can be incorporated into both surfaces.

The inventive glass substrate for a compact fluorescent lamp can be made by several methods. For example (1) a glass or glass-ceramic substrate can be formed into a dome shape with the electronics and screw base nestled in the cavity formed by the dome; (2) the substrate can be formed into a shape which includes a neck that can be connected to a screw base; or (3) the substrate can be made from several parts which can be joined to enclose the ballast and electronics. The above options are not mutually exclusive, and may be combined several ways in a single lamp type.

DETAILED DESCRIPTION OF THE INVENTION

The compact fluorescent tamp of this invention has an exterior surface and an interior surface, and has the shape of a conventional light bulb. The lamp comprises at least one thin glass envelope having a front surface and a back surface laminated and integrated together to form a unitary envelope body essentially free of any sealing materials and having at least one gas discharge channel. In a particularly, useful embodiment, the glass envelope exhibits a weight to area ratio of $\leq 1.0$ g/cm$^2$. Each channel is provided with a discharge or ionizable gas and at least two electrodes in communication with, and located at opposite ends of, the gas discharge channel for generating an arc discharge therebetween. When assembled, the front surface of the envelope forms the exterior surface of the lamp and the back surface of the envelope, the interior surface of the lamp. The interior surface of the lamp defines a cavity within the lamp which houses a ballast which is in electrical contact with the two electrodes. A screw-in base which is also in electrical contact with the ballast is secured to the lamp.

Figure 2:
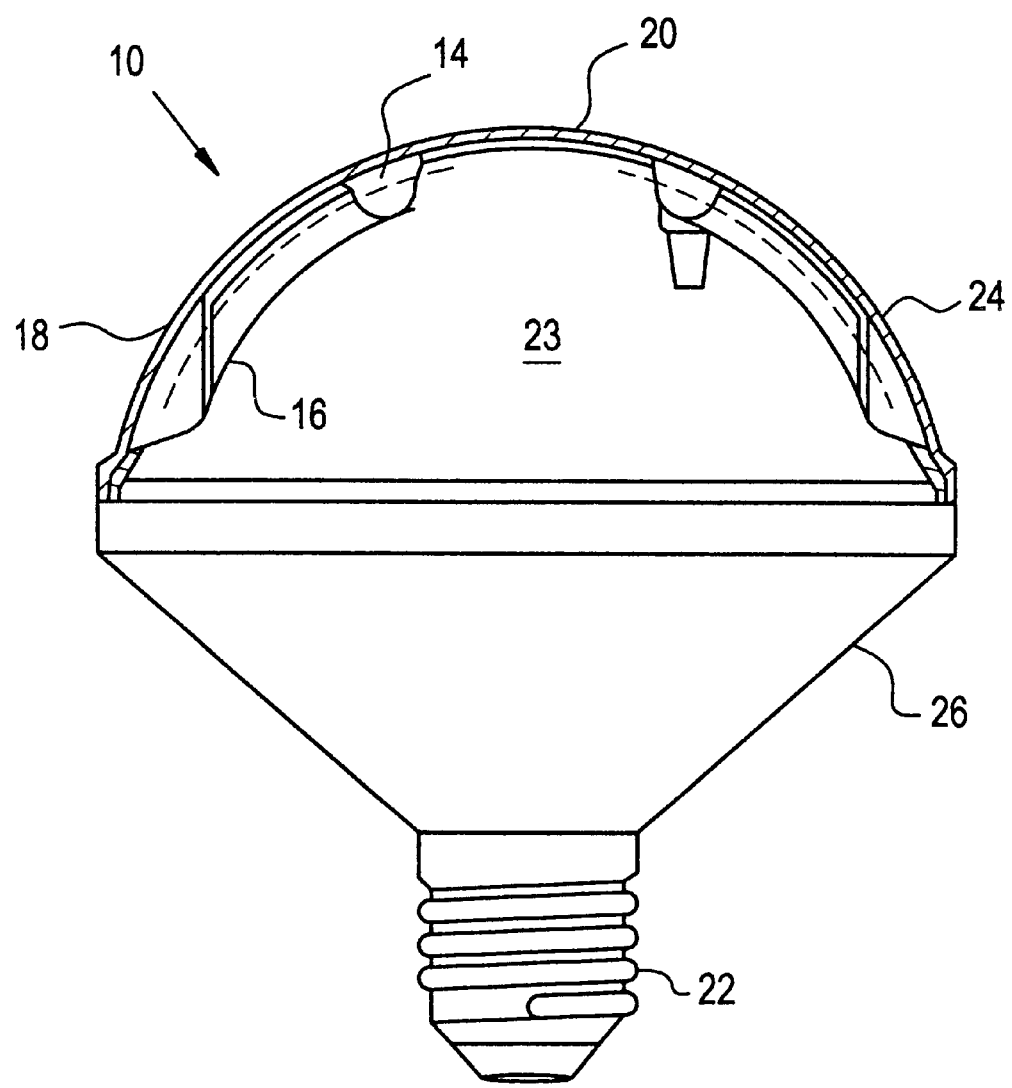
FIG. 2 shows a dome-shaped compact fluorescent lamp having a cylindrical envelope and channel formed from smooth, curved inner and outer ribbons.

The front and back surfaces of the envelope may have a cylindrical shape. In a preferred embodiment, the front surface has a smooth, curved shape and the back surface has a cylindrical shape as shown in FIG. 2.

Figure 4:
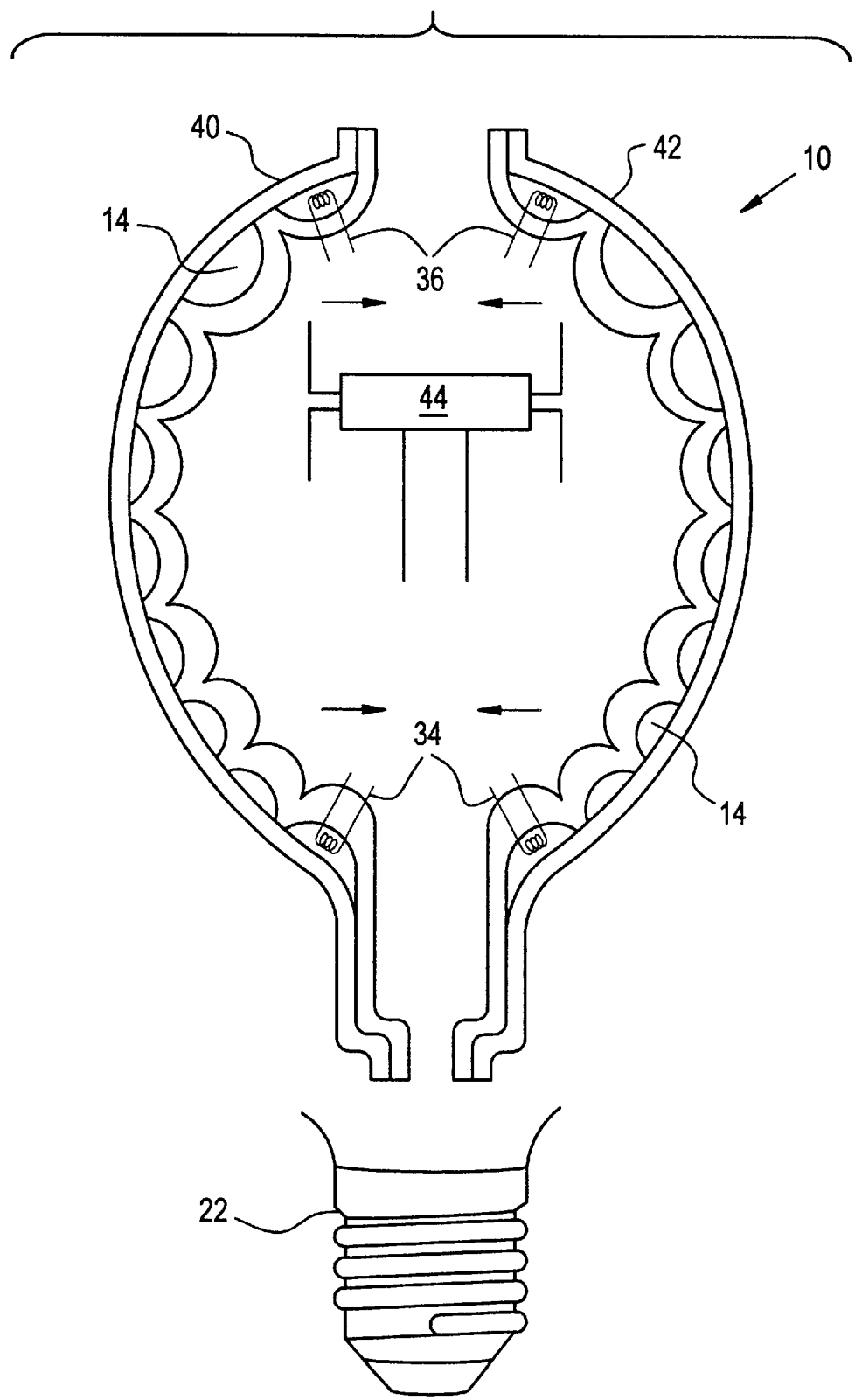
FIG. 4 illustrates an embodiment of the invention in which the compact lamp is formed from two halves.

The envelope may be formed initially as a unitary body having the desired shape. In one preferred embodiment, the lamp is formed by joining two channeled thin glass envelope halves as shown in FIG. 4. In this embodiment, each glass envelope has at least two electrodes in communication with the channel which in turn is in communication with the ballast.

The cavity, while sealed, is not evacuated and does not include a discharge gas. Instead, the discharge gas is contained in the channel(s). This is the key that allows for the commercial production of fluorescent lamps according to this invention in the shape of a conventional light bulb.

The laminated envelope forming the fluorescent lamp of the present invention can be made according to the methods disclosed in U.S. patent application Ser. Nos. 08/634,485 (Allen et al.), Ser. No. 08/851,320 (Allen et al.) and co-pending U.S. provisional patent application Ser. No. 60/076,968 having the title "Channeled Glass Article and Method Therefor" and having Stephen R. Allen as sole inventor, co-assigned to the instant assignee and herein incorporated by reference.

The above-referenced applications describe a method of forming glass envelopes containing internally enclosed channels which method can be adapted to the present invention. Specifically, a method is described comprising the following steps: (a) delivering a first or channel-forming ribbon of molten glass to a surface of a mold assembly having a mold cavity possessing at least one channel-forming groove formed there within and a peripheral surface, wherein the channel-forming ribbon overlies the mold cavity and the peripheral surface of the mold assembly; (b) causing the channel-forming ribbon of molten glass to substantially conform to the contour of the mold cavity resulting in the formation of at least one channel in the ribbon of the molten glass; (c) delivering and depositing a second or sealing ribbon of molten glass to the outer surface of the channel-forming ribbon of molten glass, wherein the viscosity of the sealing ribbon is such that the sealing ribbon bridges, but does not sag into contact with the surface of the channel of the channel-forming ribbon, but is still molten enough to form a hermetic seal wherever the sealing ribbon contacts the channel-forming ribbon, thereby forming in a glass article possessing at least one enclosed channel; and (d) removing the glass article from the mold. The result of this process is formation of a hermetic seal wherever the seal ribbon contacts the channel-forming ribbon to form a glass article with at least one enclosed channel.

In another embodiment, the sealing ribbon is caused to stretch so as to form a sealing ribbon having a thin cross-section. The stretching also causes the hermetic seals between the sealing ribbon and the channel ribbons to have a thin cross-section. The glass envelope formed by the above-described method comprises a front surface and a back surface laminated and integrated together to form a unitary envelope body essentially free of any sealing materials and having at least one gas discharge channel, wherein the gas-discharge channel has a front surface having a thin cross-section and wherein the laminated glass envelope has a thin cross-section. The laminated glass envelope exhibits a weight to area ratio of $\leq 1.0$ g/cm$^2$. Conformance of the channel-forming molten glass ribbon to the mold cavity is attained by gravity forces, vacuum actuation or a combination of both.

I have found that the above glass forming methods can be used in compact fluorescent lighting to provide some distinct advantages over currently available products which use bent tubing inside an envelope. One major advantage of the instant compact lap is that the appearance is more like a standard incandescent light source. In the past, attempts have been made to obtain a similar appearance by putting a plastic cover over a tube inside a translucent envelope. I have found that by using the present method, the light output is at the surface of the transparent substrate and one is thus able to achieve the appearance of a standard incandescent light source without the need for a cover. My design also has a potential for more light because longer channel paths can be placed in a given space than was possible with prior art tubing. Furthermore, using the present design the overall height of compact fluorescent lamps can be reduced to fit into many fixtures including conventional light fixtures.

The present invention is further described below with reference to the drawings which illustrate typical embodiments of compact fluorescent lamps 10 which can be produced using the present forming method.

Figure 1:
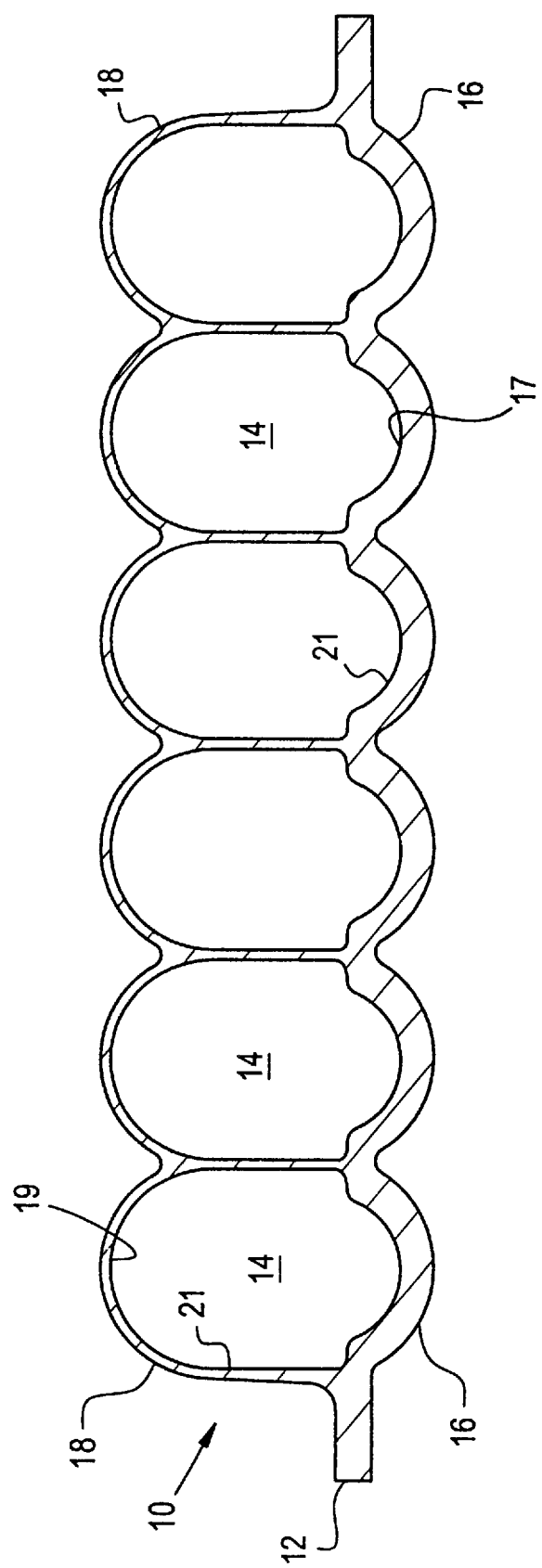
FIG. 1 is a cross-sectional view of a glass article useful as a compact fluorescent lamp.

FIG. 1 is a cross-sectional view of glass article (lamp) 10 in which glass ribbons 16 and 18 form envelope 12 and channels 14. As shown, the back surfaces 17 and 19 of ribbons 16 and 18 respectively, form the interior surface of the lamp and also define cavity or channel 14. The interior surfaces of the lamp, formed by back surfaces 17 and 19, are coated with phosphor 21.

Figure 2A:
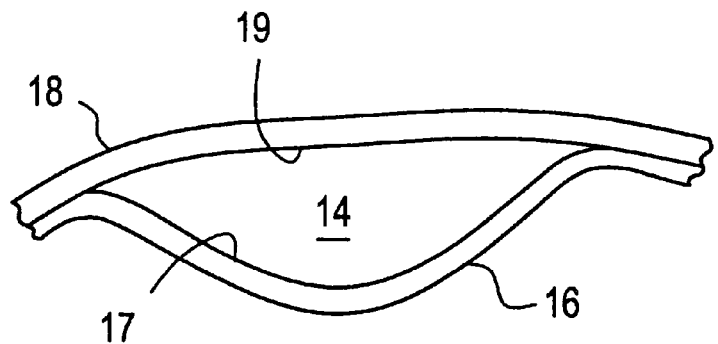
FIGS. 2A and 2B illustrate other channel shapes possible for the article of FIG. 2.
Figure 2B:
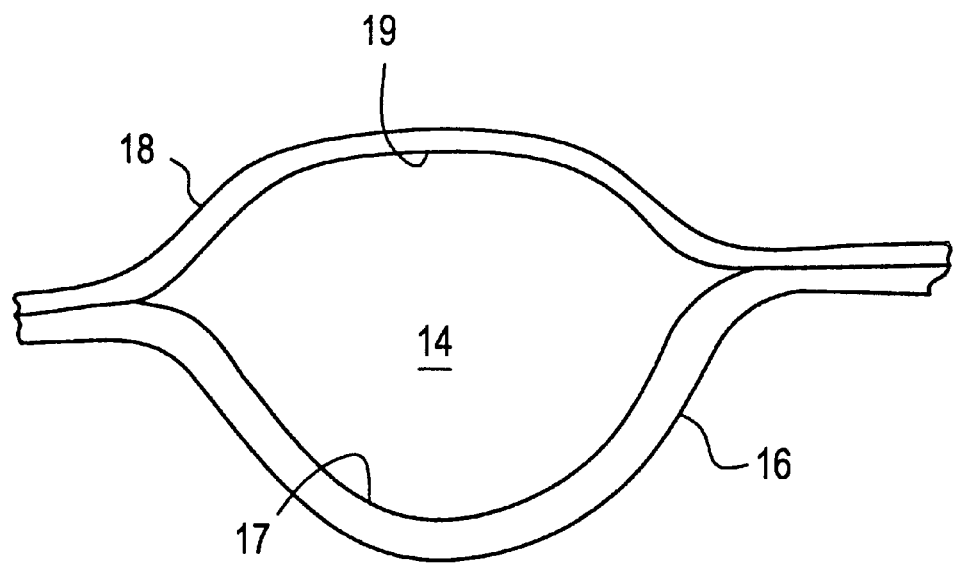

FIG. 2 shows a compact fluorescent lamp article 10 formed into a dome shaped envelope 20 forming an enclosure 23 with ballast/electronics (not shown) housed in the enclosure, a lower or base portion 26 connected to the upper portion 24 of the envelope, and screw base 22 nestled underneath the assembly (upper and lower portions), for the purpose of securing the lamp into a fixture. In this embodiment, the ballast (electric) may also be housed in base portion 26. FIG. 2A and FIG. 2B are cross-sectional views illustrating various shapes into which the ribbons may be formed.

Figure 3:
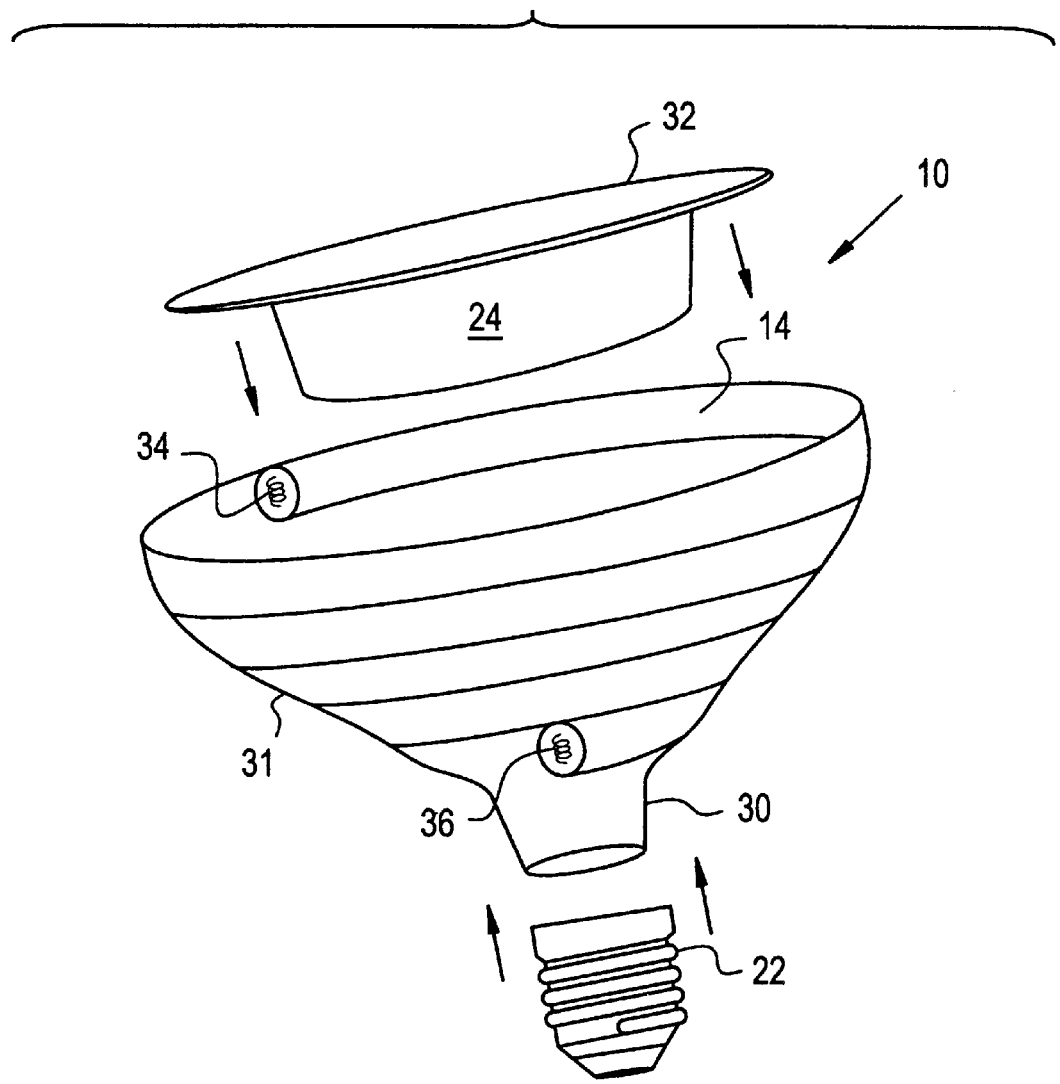
FIGS. 3, 3A, 3B, and 3C illustrate the flexibility of lamp shapes and designs that may be obtained from the inventive method.
Figure 3B:
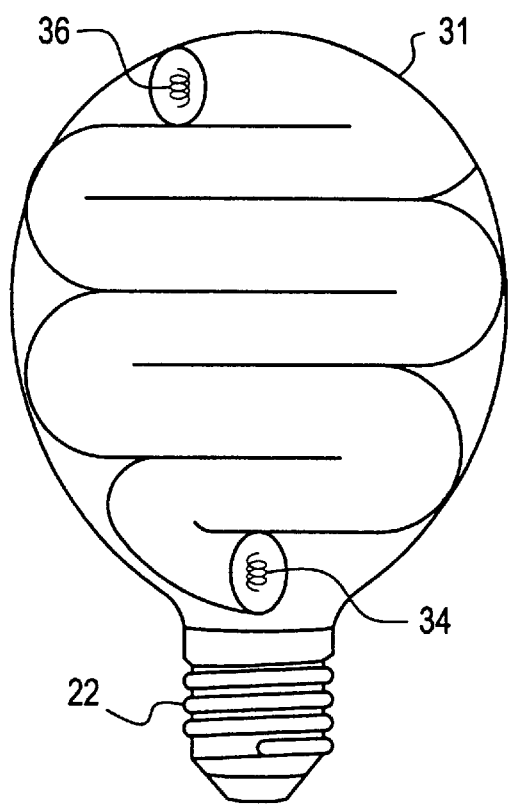
Figure 3A:
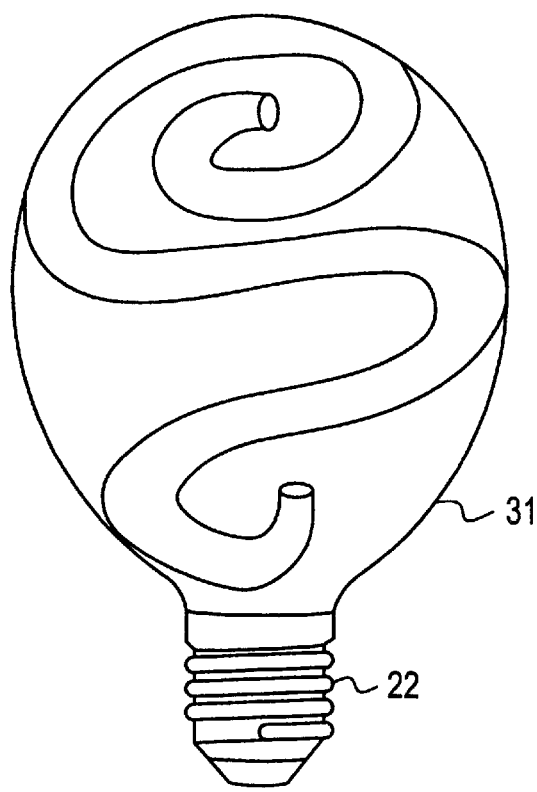
Figure 3C:
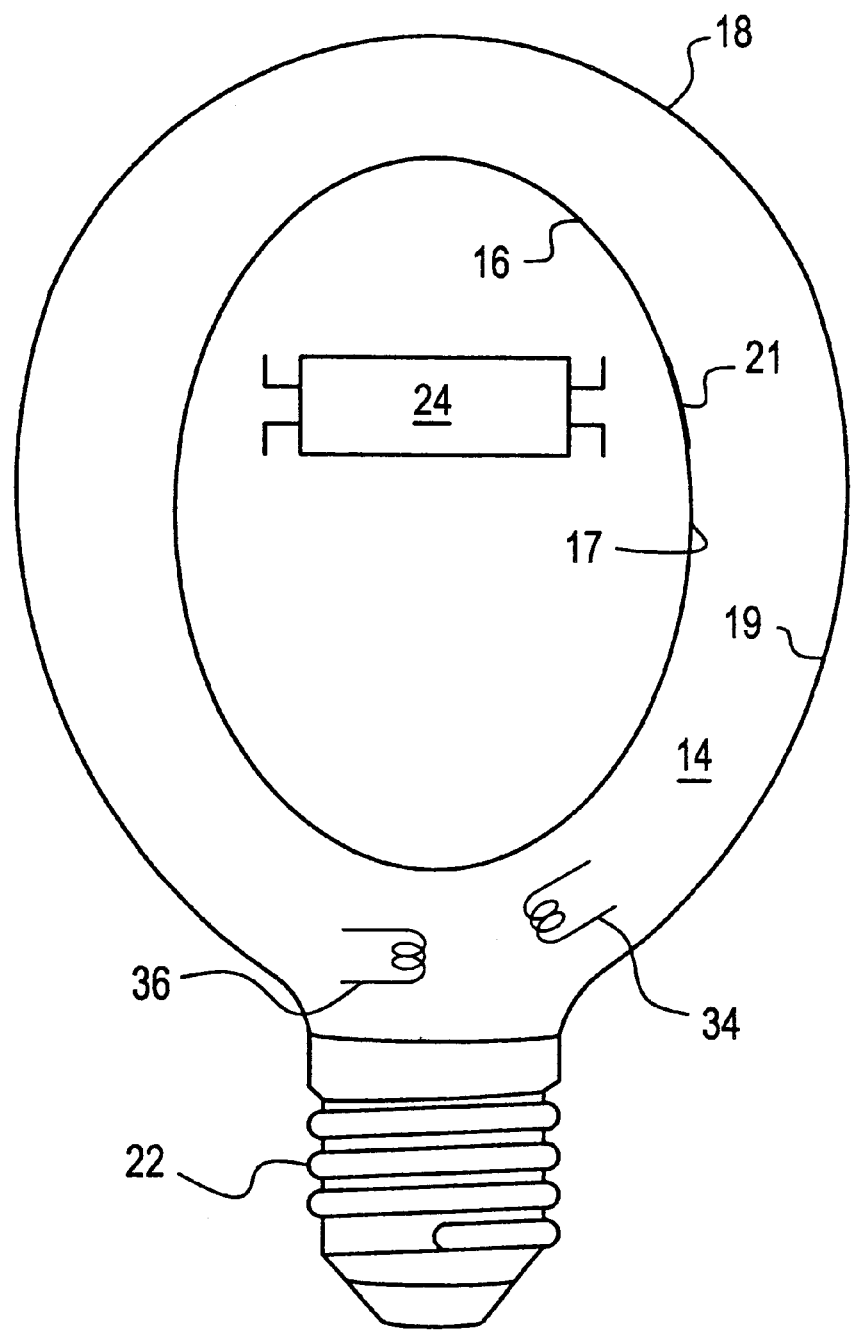

FIG. 3 shows fluorescent lamp 10 formed into a shape which includes neck 30 for connecting envelope 31 to screw base 22. The electronics (not shown) are nestled under top portion 32 of article 10. The shape and form of the paths formed by channel 14 can be varied depending on the desired effect. For example, channels 14 can be wide apart having more of an S-shaped spacing as illustrated by FIG. 3A or closely wound as illustrated in FIG. 3B. Alternatively, the path may be of a simple smooth design as shown in FIG. 3C, provided that in all cases the ballast 24 is in electrical contact with electrodes 34 and 36.

FIG. 4 shows article 10 assembled in two halves, 40 and 42. When joined, halves 40 and 42 enclose electronic ballast 44 and then connect to base 22. Each half 40 and 42 includes a pair of electrodes 34 and 36 in electrical communication with channels 14 and ballast 44. Ballast 44 also electrically communicates with base 22. The two halves may be joined using any known technique. In a preferred embodiment, halves 40 and 42 are joined by means of heat-resistant materials such as epoxy or metal bands or clips. One consideration in determining the most suitable material for joining the parts is to avoid generating excessive heat in the process as this may damage the electronics and ballast within the lamp cavity. With this in mind, certain low temperature glass frits may be used to join the parts. While FIG. 4 illustrates an envelope assembled from two halves, a similar technique may be used to assemble an envelope from several parts.

The transparent envelopes disclosed herein are preferably comprised of glass and/or glass-ceramic materials. Preferably, the envelope is a hard glass exhibiting good thermal and mechanical properties (i.e., having good coefficient of thermal expansion, and impact resistance). Useful glass materials for this application include, soda-lime silicates, borosilicates, aluminosilicates, boroaluminosilicates and the like. For example, glass envelopes have been produced from Corning Code 7251, available from Corning Incorporated, Corning, N.Y.

It should be understood that the foregoing represent illustrative embodiments of the invention, and are not intended to embody all aspects of the invention. In addition to the above embodiments, it will be clear to persons skilled in the art that numerous modifications and changes can be made to the illustrative embodiments without departing from the intended spirit and scope of the invention.

I claim:

1. A compact spherical bulb fluorescent lamp having an exterior surface and an interior surface, said lamp comprising an envelope having a front and back surface laminated and integrated together to form a unitary envelope essentially free of any sealing materials wherein the envelope is formed from a molten channel forming ribbon and a molten sealing ribbon wherein the ribbons are still molten enough to form a hermetic seal, said lamp being characterized in that said envelope has a spherical bulb shape, wherein the front surface of the envelope forms the exterior surface of the lamp and the back surface of the envelope forms the interior surface of the lamp, and wherein the interior surface of the lamp defines a cavity, said interior surface further comprising a coating of phosphur.

2. A lamp according to claim 1 wherein the interior surface comprises at least one gas discharge channel capable of receiving an ionizable gas, and at least two electrodes in communication with said channel, said electrodes being located at opposite ends of the gas discharge channel.

3. A lamp according to claim 1 further comprising a ballast housed in the cavity, said ballast being in electrical contact with said electrodes.

4. A lamp according to claim 3 further comprising a screw-in base secured to the envelope, said base being in electrical contact with the ballast.

5. A lamp according to claim 1 wherein the front surface and the back surface of the envelope define a cylindrical shape.

6. A lamp according to claim 1 wherein the front surface has a smooth, curved shape while the back surface defines a cylindrical shape.

7. A lamp according to claim 1 wherein said envelope comprises at least two glass parts joined to form a unitary glass envelope.

8. A lamp according to claim 1 wherein said envelope comprises a glass material selected from the group consisting of borosilicate, aluminosilicate, boroaluminosiliciate and soda-lime silicate.

9. A lamp according to claim 1 wherein the ionizable gas is selected from the group consisting of mercury, xenon, krypton, argon, neon, helium and mixtures thereof.

10. A lamp according to claim 1 further comprising a screw-in base secured to the envelope, said base being in electrical contact with the cavity.

11. A lamp according to claim 1 wherein the envelope has a weight to area ratio of $\leq 1.0$ g/cm$^2$.

* * * * *